United States Patent [19]
Dillenbeck et al.

[11] Patent Number: 5,423,378
[45] Date of Patent: Jun. 13, 1995

[54] HEAT EXCHANGER ELEMENT AND HEAT EXCHANGER USING SAME

[75] Inventors: Warren H. Dillenbeck; Daryl K. Showalter, both of Harrisonburg, Va.

[73] Assignee: Dunham-Bush, Harrisonburg, Va.

[21] Appl. No.: 206,156

[22] Filed: Mar. 7, 1994

[51] Int. Cl.$^6$ .............................................. F28D 1/04
[52] U.S. Cl. ................................. 165/132; 165/163; 165/162
[58] Field of Search .................... 165/132, 163, 162

[56] References Cited

U.S. PATENT DOCUMENTS

| | | | |
|---|---|---|---|
| 4,346,759 | 8/1982 | Cohen et al. | 165/163 |
| 4,479,533 | 10/1984 | Persson et al. | 165/140 |
| 4,484,624 | 11/1984 | Vleggaar et al. | 165/172 |
| 4,538,678 | 9/1985 | Fukumoto | 165/162 |
| 5,109,920 | 5/1992 | Merryfull | 165/163 |

FOREIGN PATENT DOCUMENTS 2017895  10/1979  United Kingdom.

*Primary Examiner*—Allen J. Flanigan
*Attorney, Agent, or Firm*—Sughrue, Mion, Zinn, Macpeak & Seas

[57] ABSTRACT

A heat exchanger element for exchanging heat between a fluid circulating in the element and a phase-change medium in a reservoir housing the element is formed of a plurality of spiral coils of flexible tubing disposed horizontally, one above the other, in a vertical stack. One end of each spiral coil is in communication with an inlet manifold and the opposite end is in communication with an outlet manifold. Preferably, the manifolds are disposed vertically, extending the height of the stack and side-by-side. Preferably, the manifolds are adjacent the outer periphery of the vertical stack of spiral coils. The spiral coils of the stack are wound alternatively clockwise and counterclockwise from a first radially outermost turn to a last radially innermost turn and arranged in pairs, one above the other. One spiral coil of each pair has the first radially outermost turn connected directly to the inlet manifold and the last radially innermost turn connected directly to the outlet manifold. The other spiral coil of the pair has its first, radially outermost turn connected directly to the outlet manifold and the last radially outermost turn connected directly to the inlet manifold. As a result, the spiral coils are connected in parallel to each other, the fluid within all of the coils flow in the same direction through the coils, and there results a temperature averaging effect between the fluid flows within respective adjacent clockwise and counterclockwise wound spiral coils of the stack.

10 Claims, 3 Drawing Sheets

HEAT EXCHANGER ELEMENT AND HEAT EXCHANGER USING SAME

This invention relates to a heat exchanger element for exchanging heat between a fluid circulating in the element and a phase-change medium in a reservoir housing such element and more particularly to a heat exchanger utilizing the same.

BACKGROUND OF THE INVENTION

In the past 20 years, there have developed cooling and heating systems for buildings comprised of a tank or reservoir filled with a phase-changing medium with a plurality of parallel heat exchange circuits submerged in the phase-change medium such as water, and with the parallel heat exchange circuits comprised of tubes which are disposed as coils and coupled to inlet and exhaust manifolds for a brine, refrigerant, or other heat exchange liquid flowing therethrough. Structural elements are employed for supporting the coiled tubes in various arrays with the coils spaced from each other having various tube flows coordinated to minimize the temperature gradient existing throughout the phase-change medium such that ice is formed simultaneously throughout the phase-change medium and with the water about the tubes displaced upwardly to prevent any build up of pressure against the walls of the reservoir.

Representative patents in this art are U.S. Pat. No. 4,294,078 issued Oct. 13, 1981 to Calvin D. Mac-Cracken, assigned to Calmac Manufacturing Corporation; and U.S. Pat. No. 5,109,920 issued May 5, 1992 to Albert E. Merryful and assigned to the common assignee.

U.S. Pat. No. 4,294,078 is characterized by the formation of a preformed flexible roll of tubing and rubberized hair preferably by rolling twin tubings or dual tubes side by side, and spaced slightly from each other into a spiral supported by a mat. First, the ends of the tubes at the outer periphery of the spirals are coupled to respective inlet and outlet manifolds for the brine flow and the ends of the adjacent tubes at the innermost turn of the spirals are connected to each other by way of a reverse bend thereby effecting flow of a brine in different directions throughout the length of the dual tubes from the inlet manifold to the outlet manifold. The adjacent tubes therefore extend longitudinally of the mat in vertically spaced fashion as helical arrays. Such structural content provides parallel flow in adjacent tubes but in opposite flow directions. This results in temperature averaging over the full length of the brine flow within adjacent coils of the heat exchange apparatus.

In U.S. Pat. No, 5,109,920, a plurality of spirals of flexible tubing are disposed one above another with one end of a given spiral being in communication with the inlet manifold and one end of the adjacent spiral being in communication with the outlet manifold and with the opposite ends of each spirals being in communication with each other. Further, the spirals are wound alternately clockwise and counterclockwise, and arranged in pairs one above the other. As such, the end of the radially outer turn of the upper spiral may be connected to the inlet manifold, the end of the radially outer turn of the next adjacent spiral may be connected to the outlet manifold, and the ends of the radially innermost turns of respective adjacent coils may be connected to each other. As such, the brine flows in both coils in the same direction.

Further, the inlet and outlet manifolds preferably extend in vertically upright, side by side fashion, both being adjacent to the outer periphery of the stack of spiral wound coils.

While such heat exchange systems have operated successfully, the refrigerant or brine flow in both coils being in the same direction and while, the heat exchanger of the 920' Patent does enjoy the advantage of the temperature averaging effect in the two immediately adjacent coils as occurs in the 078' Patent, the '920 patent, FIG. 8, has adjacent coils connected in the middle. The disadvantage is that by having two coils in series, tube connections are in the bundle rather than all coils being in parallel and no internal connections, as in this invention.

SUMMARY OF THE INVENTION

The heat exchange element and the resulting heat exchanger with the element immersed in a two phase fluid such as water and with the coil structure subjected to refrigerant flow, resides in the unique connection of alternating direction wound spiral coils starting from the top coil to the bottom coil. The top coil is wound counterclockwise starting at the outer edge of the spiral and is connected to the inlet header at its outermost turn. From the innermost turn of the top coil spiral, the tube is routed radially back to the outlet header which extends parallel to the inlet header and to the side of the same. The next lower coil is wound clockwise starting from the outer edge of the spiral with that outer edge connected directly to the outlet header while, the innermost turn of the spiral lower coil, has the tube end thereof routed radially back to the inlet header. The stack of spiral coils alternates in such fashion throughout the full height of the coil stack. As a result the liquid flow in the spiral coils is always in the same (clockwise) direction for the illustrated embodiment. Importantly, a temperature averaging effect results between the vertically adjacent tubes with the top coil being fed coldest heat exchange liquid in the outer turn and the next lower coil being fed coldest liquid in the inner turn and so on.

The heat exchange consists in a large, double-wall fiberglass cylindrical tank having a removable cover with the tank and cover insulated with a given thickness of urethane foam. Preferably a heat exchange element is made up of fifty-six spiral coils, each coil in a horizontal plane, having the ends connected to vertical inlet and outlet headers is assembled in a rigid stack and installed in the tank.

Preferably the coils are made of medium-density polyethylene tubing with the spiral coils being wound as the tube emerges from the extruder at a temperature of 40° C. to 60° C. Preferably an equal number of circumferentially spaced PVC spacer bars arranged radially in a winding fixture constrain the spiral coils with the spacer bar having keyhole shaped slots in longitudinally spaced position along the upper edge which act to receive and position the tubes. The slots are provided with oppositely tapered portions leading to a minimal slot width, spaced from the open end and terminating in a cylindrical bottom wall such that the tube turns are snap fitted into the keyhole shaped slots to hold the tube tightly in position at tube intersections with the spacer bars during spiral wrapping.

The top of the spacer bars are shaped with an arrowhead barb which fits into an arrowhead shaped slot within a widened lower end of the overlying spacer bar. As such, multiple spacer bars are stacked and interlocked in vertical planes to provide a stable support for the coil stack. The coil stack is preferably laid up starting with a steel spider having eight radial arms to support eight spacer bars of the lower spiral coil. Further, an intermediate spider is provided at the mid height of the coil stack and a transverse bean across the top of the coil stack and a transverse beam across the top of the coil stack. Four vertical rods connect alternate arms of the lower spider to the intermediate spider to render the coil-stack rigid. The rods continue to the top of the coil stack. Once the coil stack is set in a tank or other enclosure, the rod ends are fastened to the tank by angle brackets to resist the buoyant force created by the less dense solid phase of the two phase liquid (water). A refrigerant or other suitable antifreeze solution or brine, formulating a heat exchange liquid is supplied under pump pressure to the heat exchange headers and coils with the pump rate establishing the desired flow through the heat exchange coils. The upper level is approximately 90% of the height of the tank. Preferably, the spiral coils have an outside diameter which is some several inches less than the internal diameter of the tank, leaving a cylindrical layer of water adjacent to the tank wall. The spiral coils also have an internal diameter of about 12 inches, leaving an open center region in which the water does not freeze. The regions of unfrozen water permit water to rise into an expansion region at the top of the tank so that the tank does not become stressed due to total freeze up and subject to rupture.

Preferably the tubes of the spiral coils are made of medium density polyethylene tubing, thermally welded into the sides of the vertically upright medium density polyethylene tube headers.

DETAILED DESCRIPTION OF THE PREFERRED EMBODIMENT

Referring the drawings in greater detail, the perspective view of the basic elements of the heat exchange element indicated generally at 10 follows that of FIGS. 8 and 9 of U.S. Pat. No. 5,109,920, and the resulting heat exchanger as set forth in that patent. Such heat exchange element incorporates a plurality of vertically stacked, horizontally positioned spiral coils in which, a counterclockwise wound spiral coil indicated generally at 12 constitutes the topmost spiral coil, of a stack or coil array 28. Only a portion of the stack 28 of preferably fifty six such coils is illustrated. The next adjacent underlying spiral coil is indicated generally at 14 and is wound, from the outside turn towards the center, in clockwise fashion in contrast to the counterclockwise winding of the top coil 12, also from the outside turn, towards its center.

Figure 1:
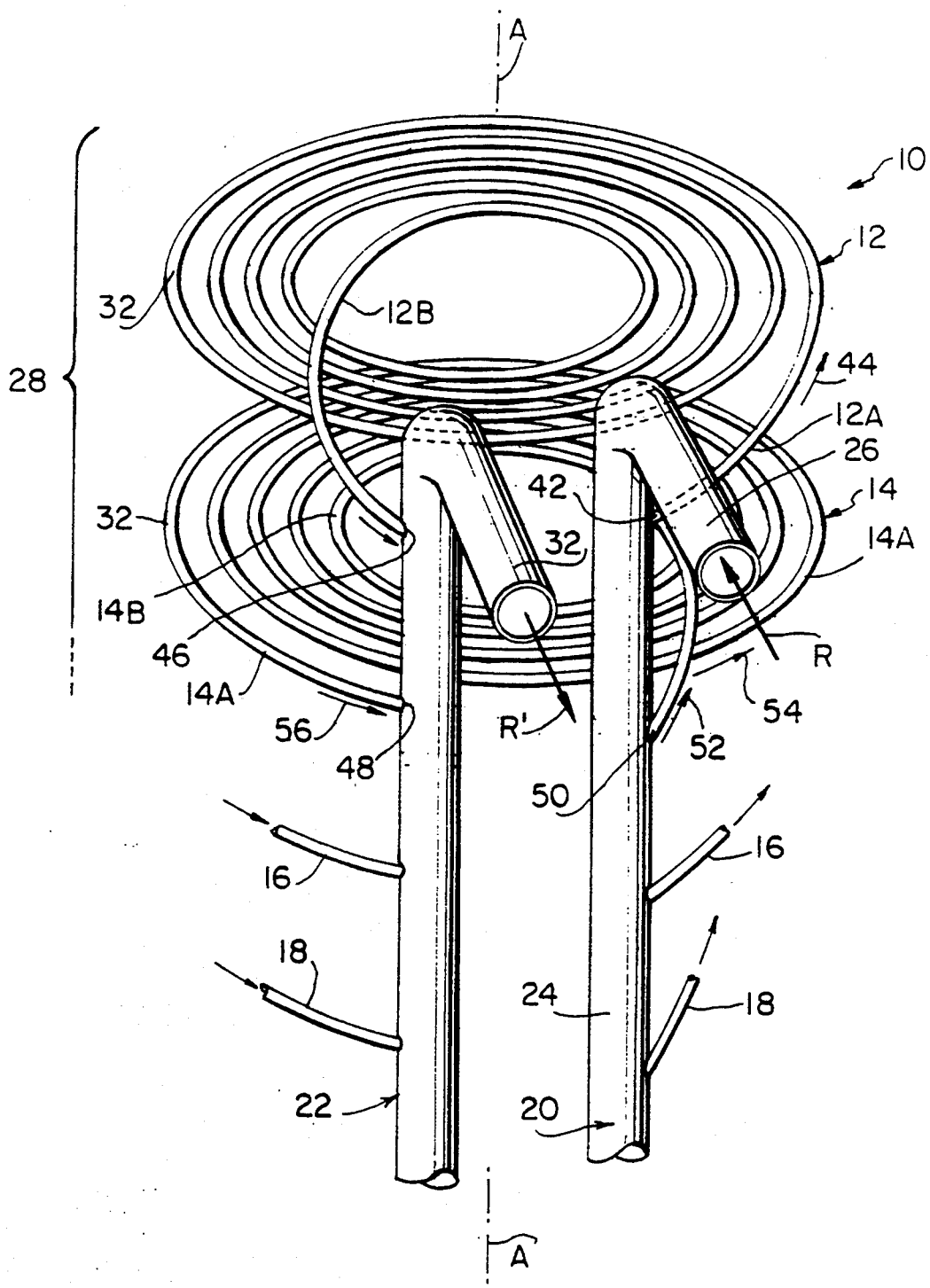
FIG. 1 is a perspective view of the components making up the improved heat exchange element forming a preferred embodiment of the invention.

In succession, the heat exchange element 10 is thereafter formed of a further, third counterclockwise wound, coil indicated generally at 16 with the ends coupled directly to the inlet and outlet manifolds or headers, indicated generally at 20 and 22, respectively, being illustrated in FIG. 1. A fourth clockwise wound coil indicated generally at 28, succeeds the counterclockwise coil 16 in stack 18. The nature of the improvement within this art, and the manner in which the coils alternate may be readily seen from the adjacent, full counterclockwise wound and clockwise wound coils 12 and 14, FIG. 1.

In that respect, the heat exchange element inlet manifold 20 which is constituted by a vertically upright pipe 24 and is topped by an L-shaped fitting 26, which receives a cold circulated brine or refrigerant R, as a typical heat exchange liquid as indicated by the headed arrow so labeled. It should be noted that the manifolds or headers 20, 22 extend vertically with respect to the stack 28 of coils 12, 14, 16, 18 with all coils being coaxial about a vertical axis A of the fitted heat exchange element 10.

The manifold 20 is thus a distributor for the cold brine or refrigerant R. Tubing indicated generally at 32, forms all coils. Coil 12 has one end of the outermost turn 12A connected to the side of the header or manifold 20 which feeds the brine, in parallel R to the various spiral coils 12, 14, 16, 18, etc. as indicated by the arrows. Such flow is always in the same direction, in this case counterclockwise. The direction of flow having nothing to do with the direction of winding of the coils which alternate counterclockwise for the first, topmost spiral coil 12, and for the third coil 16, and clockwise for illustrated second, 14 and fourth, 18 coils of the array or stack 28, FIG. 1.

To the opposite side of the inlet header 20, an outlet header 22 receives the return flow from the stack of closely spaced coils 12, 14, 16, 18, etc., formed by the tubing 32, with those return flows entering the side of the outlet manifold 22 over the vertical length of the same. That outlet flow is discharged as indicated by arrow R' from an L-shaped outlet fitting 30. With the manifolds 20, 22 situated at the outer periphery of the stack or array 28 of coils, the result is to effect a plurality (preferably fifty-six) of parallel flow, same direction, circuits for the brine or refrigerant R.

The tubing 32 making up the coils 12, 14, 16, 18 etc. may be of 0.75 inch outside diameter medium density polyethylene and, the manifolds 20, 22 may be formed of 2.38 inch O.D. medium-density polyethylene in the illustrated embodiment. They may be of other sizes, and may be made of other materials such as copper rather than of extruded plastic material.

Figure 2:
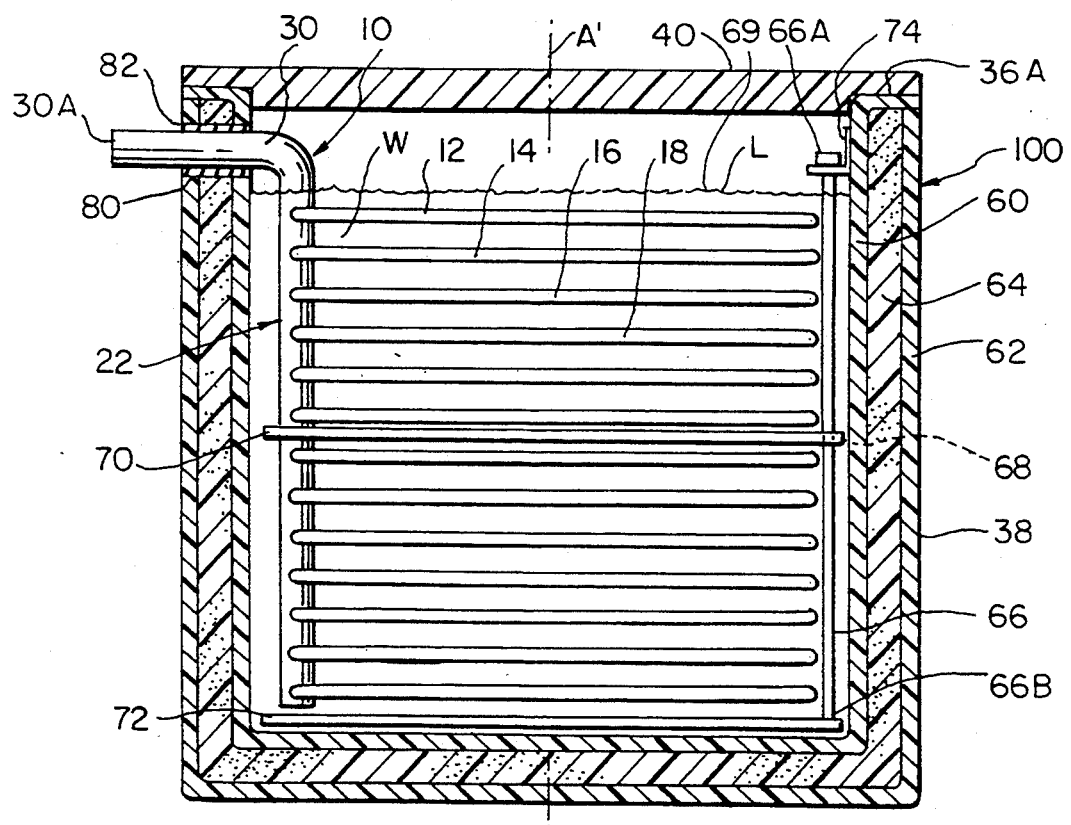
FIG. 2 is a vertical sectional view of a heat exchanger consisting of a fiberglass tank and removable cover with the heating element of FIG. 1 mounted therein in a vertically upright coaxial position.

The operation and effectiveness of the heat exchange element 10 may be appreciated from the perspective view of FIG. 1 and the side elevational view, FIG. 2. Assuming that the unit 10 is placed in the position as shown in FIG. 2 fully immersed in water W to a level L below the upper edge 36A of a tank 36, having a cylindrical sidewall 38, and with the removable cover 40 in place, the flow of brine or refrigerant R from the inlet header or manifold 20 under circulating pump pressure from a pump (not shown) results in the brine R moving counterclockwise through the first spiral coil 12 and with that the brine at its coldest just downstream from the connection 42 of the tubing 32 of coil 12 to the side of the inlet header or manifold 20 just below the inlet fitting 26. That counterclockwise circulation is evidenced by arrow 44. The circulation continues in a counterclockwise manner from the radially outermost turn 12A, to the radially innermost turn 12B of coil 12. The tubing 32 of coil 12 extends radially from near the center of the first coil 12, at tubing 12B, to the side of the outlet manifold 22, just below the outlet manifold fitting 30. The brine R then returns to the suction side of the circulation pump as evidenced by the arrow R'. In returning from the center of the spiral coil 12, the tubing 32 crosses radially over all of the turns from the radially innermost turn 12B of coil 12 past the radially outermost turn 12A and forms a sealed connection to the manifold 22, at a connection 46.

Looking next to the immediately underlying, adjacent spiral coil 14, coil 14 has its outermost turn 14A, connected, not to the inlet manifold 20, but to the outlet manifold 22 at a connection point 48. Coil 14 is wound clockwise from the radially outermost turn 14A to the radially innermost turn 14B where, the end of coil 14 from the innermost turn 14B extends in a near radially direction, outwardly across all of the turns of coil 14 including outermost turn 14A, and connects directly to the side of the inlet manifold 20 at connection 50. It is at connection point 50, that the second, clockwise wound spiral coil 14 receives the coldest brine as indicated by arrow 52. The brine flow is in the same counterclockwise direction throughout the reversely wound coil 14, similar to the flow within the top, oppositely wound spiral coil 12 of the stacked array 28. This counterclockwise brine flow terminates in the outer coil turn 14A as evidenced by the sequence of arrows 54 and 56, at the side of the outlet manifold 21 at connection point 48 below connecting point 46 for first coil turn 12 of the stack. In this case, the coldest brine or refrigerant R, is within the radially innermost turn 14B, underlying the radially innermost turn 12B where the brine R is the warmest in the top spiral coil 12.

As such, the heat exchange element 10 fulfills a further condition that there be a temperature averaging effect of the heat exchange flows over the complete extent of the preferably fifty-six coils of the heat exchange element 10 and within the complete vertical extent of the heat exchanger, indicated generally at 100, FIG. 2 which incorporates the heat exchange element 10 of FIG. 1 therein. Such temperature averaging effect, does not require the brine or refrigerant R to flow in opposite directions within the tubing of the immediately adjacent coils such as 12 and 14 of the coil stack or array 28 of FIGS. 1 and 2 to achieve that end.

The tank or reservoir of heat exchanger 100, indicated generally at 36, has a removable cover thereof at 40. The heat exchanger tank or reservoir 36, FIG. 2, is comprised of an inner fiberglass shell 60 and an outer fiberglass shell 62, with the inner and outer fiberglass shells sandwiching a mass of urethane foam insulation 64 which may be two inches or more in thickness.

The shells 60 and 62 are spaced from each other over the full extent of the tank 36 and are sealed, at one axial end by way of a tank top wall or edge 36A. At 90° circumferential spacing about the inner periphery of the tank 36, there are mounted four vertically upright metal rods 66 which rods pass through suitable holes 68 within an intermediate spider 70, and which are fixed at their lower ends 66B to the lower spider 72. Both spiders 70 and 72 have an equal number of circumferentially spaced, radial arms, preferably eight in number. Mounted to the inner fiberglass shell 60, are suitable L-shaped brackets 74 which capture headed ends 66A of the vertical rods. This structural assembly maintains the fifty-six spiral coils in position defining the vertical stack or array 28 of coils forming the principle components of the heat exchange element 10. As further illustrated in the sectional view of FIG. 2, circular ports 80 extend through the cylindrical sidewall 38 of the tank 36 adjacent the upper edge 36A of that tank and above the level L of the water W or other change of phase liquid of the heat exchange system. The fittings such as fitting 30 at the top of the outlet manifold 22 has a discharge port 30A projecting outside of the tank 36, and which port is connected to the suction side of a pump (not shown) for circulating the brine or refrigerant R through a closed loop including the manifolds 20 and 22, and the fifty six stacked spiral coils (of which coils 10, 12, 14, 16 and 18 are numbered in FIGS. 1 and 2). Only some twenty such coils are illustrated in FIG. 2 for simplicity purposes. A sealing ring or the like 82 may surround the exterior of the fitting 30 to form a liquid proof seal or bracing about the L-shaped fitting 30 where an end of the elbowed manifold 22 projects outwardly of the tank 36. In the instant embodiment, the L-shaped fitting 30 penetrates the tank sidewall above the operating liquid level. Further, the removable cover maybe sealably mounted to the upper edge 36A of the fiberglass tank 36.

The inlet manifold 20 is coupled to inlet fitting 26 having one end which projects radially outside of tank 36 horizontal in similar fashion to that of outlet fitting 30, and to one side thereof.

Figure 3:
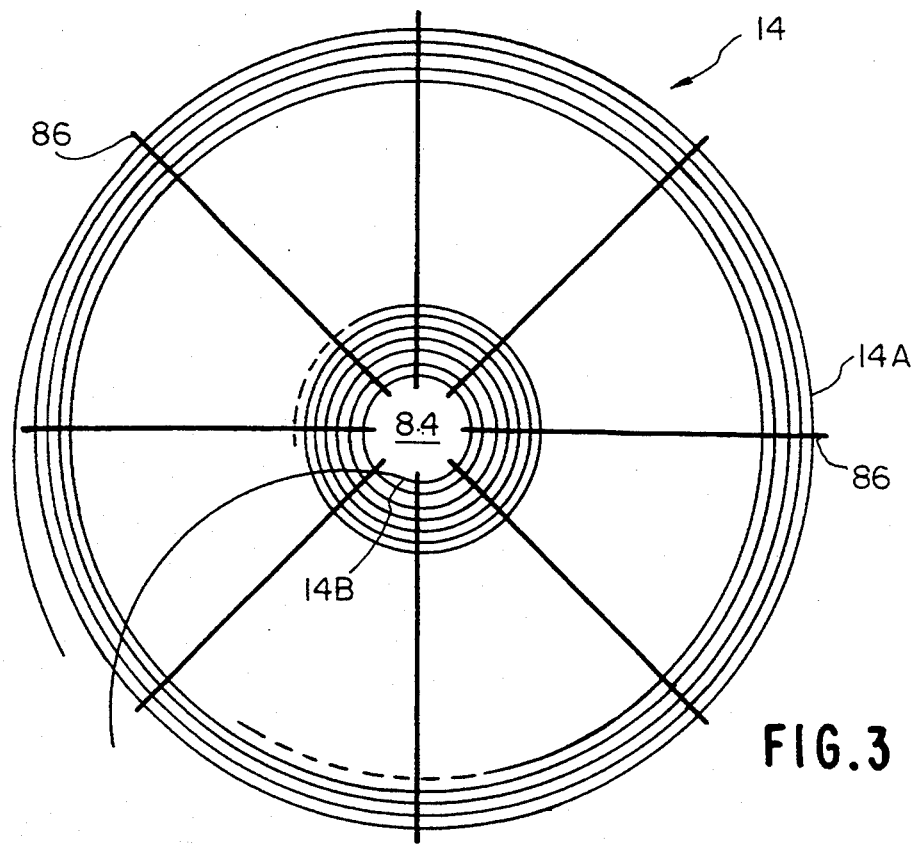
FIG. 3 is a top plan view of the heat exchange element of FIG. 1, prior to placement within the tank of FIG. 2.
Figure 4:
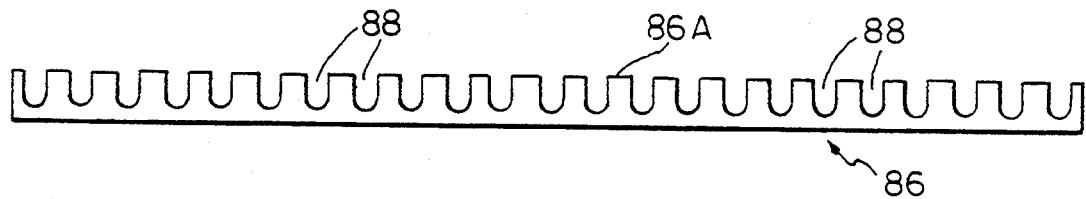
FIG. 4 is a side elevational view of one of the spacer bars employed in the manufacture of the heat exchange element of FIG. 3.
Figure 5:
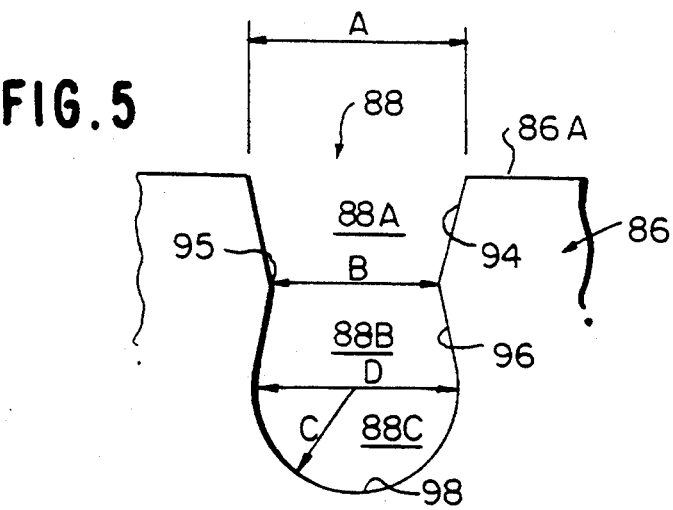
FIG. 5 is an enlarged side view of a portion of the spacer bar of FIG. 4 illustrating the configuration and the dimensional relationship of one of the keyhole slots receiving the spiral tubing coil of the heat exchange element of FIG. 1.

Reference to FIGS. 3-6 inclusive illustrates a preferred way of forming a heat exchange spiral coil using a plurality of radially projecting spacer bars 86. In this case, coil 14, which is wound clockwise from the outermost coil turn 14A to the innermost coil turn 14B, leaves a circular central cavity 84. The winding and preforming the coil tubing 32 uses eight radially directed and circumferentially spaced spacer bars 86. The spacer bars 86, equally spaced at 45°, are fixed to a rotating former disk. The spacer bars indicated generally at 86, FIG. 3 are of a given length, and bear equally spaced keyhole slots or notches 88 within the upper peripheral edge, 86A. The notches 88 are capable of receiving a substantial number of coil tubing 32 turns from the radially outermost initial turn 14A to the final, radially innermost turn 14B. The keyhole slots are twenty-three in number, within each spacer bar 86 in the illustrated embodiment. Those keyhole slots indicated generally at 88 are formed with a trapezoidal cross section entry portion 88A defined by opposed converging sidewalls 94, tapering downwardly and inwardly towards each other to a minimum spacing or distance B of 0.600 inches forming a narrow width throat 95, a diverging trapezoidal shape portion 88B, defined by converging oblique sidewalls 96 terminating at its widest part at 0.730 inches, and being open to a semi-cylindrical bottom portion 88C formed by a circular bottom wall 98 of radius P.

As such, the throat 95 functions to momentarily compress the tubular tubing 32 of slightly larger outlet diameter moving downwardly into the keyhole slot 88 having the three defined sections or portions. The initial entry slot portion 88A of is of trapezoidal form defined by downwardly and inwardly flaring sidewalls 94 terminating at the narrowest point of the slot 88 in throat 95, with the slot thereafter increasing in width, and forming a section 88B of trapezoidal shape defined by diverging side walls 96. Further, the slots or notches 88 terminate in an enlarged width, semi-circular portion 88C whose slot width at that point is approximately 0.730 inches, slightly less than the maximum width of 760 inches at the open end of slot 88, at the upper edge 86a of the spacer bar 86. The slot semi-circular portion 88C is defined by a rounded bottom wall 98, having a diameter D of 0.7380+ or −0.0050 inches. In the instant embodiment, the overall vertical height of the slot is approximately 1.120 inches.

Figure 6:
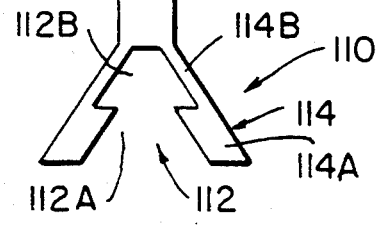
FIG. 6 is an enlarged end view of the spacer bar of FIG. 4.

From FIG. 6 with the overall vertical height of the spacer bar being 1.842 inches, the slots 88 occupy approximately ⅔ of that vertical height. The twenty-three keyhole notches or slots 88 are on 1.69 inch centers in the illustrated embodiment. The spacer bar notches offer the advantage of only momentarily compressing the hollow tubular tubes 32 locally, as they pass into the rounded bottom section 88C of the notch, rather than having the tubes distorted by squeezing over a major portion of this extent of movement from the upper surface 86a of the spacer bar to a nested position with the axis of the tube 32 coinciding with the center 104 of the radius C, defining the circular bottom wall 102 of each keyhole notch.

From FIG. 6 which is an end view of the spacer bar, it is apparent that the spacer bar is of a uniform thickness over the major portion of its height with the exception of the widened arrow head indicated generally at 106 at the top, which is sized appropriately to that of an arrow head shaped cavity 112 within a widened bottom portion 110 thereof. The spacer bar bottom portion 110 is of generally triangular shape, and which includes a central bottom groove 112 running the full length of the spacer bar. The spacer bars may be of extruded plastic or the like. The groove 112 includes a lower groove portion 112A of trapezoidal cross sectional configuration which partially defines with triangular shaped groove upper cavity 112B, a pair of splayed legs 114. Legs 114 have wide portions 114A defining the trapezoidal groove portion 112B and narrowed portions 114B to opposite sides of the arrow head shaped groove portion 112B.

The narrowed leg portions 114B give flexibility to the splayed bottom of the spacer bar to permit ready insertion of the arrowhead 106 of the immediately underlying spacer bar when the spacer bars 86 are stacked as a vertical array. In the case of the illustrated embodiment, fifty-six such spacer bars are provided at each of the 45° circumferentially spaced spacer bar locations, FIG. 3. Each spacer bar 86 supports twenty-three tube turns of each coil along respective notches 88 within the upper edge 86a of that molded plastic member. The narrow width portions 114B of the legs provide sufficient resilience so that the spacer bars 86 are simply snap fitted together much in the manner of toy building block sets to form an integrated supporting structure capable of rigidly holding the twenty three tube turns for each of the spiral coils 12, 14, 16 etc. within the heat exchange element stacked coil array 28 of heat exchanger 100, FIG. 2. The stacked array 28 of coils is reinforced by the inclusion of the intermediate and lower spiders 70, 72 along with the four vertical rods fixed at their lower ends to the lower spider 72, passing through the intermediate spider 70, and being fixed at their upper ends 66A to the brackets 74. The brackets are fixed to the insides of circumferential wall 38 of tank 36. An upper beam 69 spans transversely across the top of the stack of coils with its ends beneath opposed brackets.

As such, the completely assembled heat exchange element 10 may be dropped into the upwardly open tank 38, with the cover 40 removed therefrom, after which the inlet fitting 26 and the outlet fitting 30 may be fixed to the upper ends of the vertically upright tubular headers 20, 22 respectively. The headers or manifolds 20, 22 themselves may be incorporated within the heat exchange element 10 prior to its placement within the interior of tank 38 with the tube 32 ends of respective coils coupled to respective manifolds 20, 22 at each coil location spaced, vertically, along the lengths of those manifolds.

The manufacture of the individual coils, the stacking of the same and the forming of a stacked array 28 with appropriate manifold connections to form a heat exchange element 10, follow the general description of manufacture of the heat exchangers within U.S. Pat. No. 5,109,920 whose content is incorporated by specific reference into this application.

Further the changes in manufacturing technique from that described herein and from the description within U.S. Pat. No. 5,109,920 as appears in column 10 of the issued patent has direct application to this invention which is an improvement within the art and an improvement over U.S. Pat. No. 5,109,920.

Similarly, in order to store cold heat exchange medium, such as a mixture of 25% ethylene glycol brine or other suitable antifreeze solution R, the brine is circulated from an electrically driven brine chilling machine (not shown) to the tank 36 at night when the electric power supply is abundant at low cost in the summertime and building cooling is not required, in particular, office buildings. This allows the cooling effect to be stored as ice formed from the water W within tank 36. At the beginning of the process, all sensible heat is removed from the phase-change medium (water) around the element 10 cooling the water to its freezing temperature. With the heat exchanger 100 of the present invention, FIG. 2, enjoying the benefit of a temperature averaging effect, as a result of the structural arrangement illustrated schematically in FIG. 1, ice forms substantially simultaneously through the element. As ice forms on the outer surface of each tube 32 of the element 10, it insulates that tube and slows down the production of more ice on it, thus ensuring an even buildup of ice throughout the element 10. The buildup of ice displaces water W from around the spiral coils, causing the water level in the tank to rise in the expansion region. Some flexibility exists within the coil bundle, accommodating slight movement due to freezing expansion. Two liquid regions remain, one within an annular space 118 between the outer periphery of the heat exchange element 10, FIG. 2, and the inner fiberglass shell 60, and the other, a central, axial region, immediately about the vertical axis A of the heat exchange element 10 coinciding with the axis A' of the heat exchanger 100 as defined by the fiberglass tank 36 and heat exchange element 10, FIG. 2.

It is readily apparent that various changes and modifications may be made within the heat exchange element and the heat exchanger utilizing such element, and particularly in the material making up the various components of these two units. Such changes and others may be made without departing from the spirit and scope of the invention which is set forth in the claims appended hereto.

What is claimed is:

1. In a heat exchanger element for exchanging heat between a fluid circulating in the element and a phase-change medium in a reservoir housing said element, said element comprising:

a plurality of spiral coils of flexible tubing disposed one above the other in a vertical stack, one end of each spiral coil being in communication with an inlet manifold and another end in communication with an outlet manifold, said spiral coils being wound alternatively clockwise and counterclockwise from a first radially outer turn to a last radially inner turn and arranged in pairs, one above the other, the improvement wherein:

one spiral coil of each pair having the first radially outer turn connected directly to said inlet manifold and having said last radially inner turn connected directly to said outlet manifold, and the other spiral coil of said pair having the first radially outer turn connected directly to said outlet tube manifold and said last radially outer turn connected directly to said inlet manifold, whereby:

said spiral coils are connected in parallel to each other and said fluid within all of said spiral coils flows in the same direction through said spiral coils, thereby resulting in a temperature averaging effect between said fluid flows within respective adjacent clockwise and counterclockwise spiral coils of respective pairs.

2. The heat exchanger element as claimed in claim 1, wherein said inlet and outlet manifolds are located adjacent the outer periphery of the stacked spiral coils and extending parallel to the axis of the stacked spiral coil array, and wherein the radially outermost turn of each spiral coil abuts a respective one of said inlet and outlet manifolds and opens internally thereof.

3. The heat exchanger element as claimed in claim 2, wherein the radially innermost turn of each spiral coil of the stacked spiral coil array has the end of that radially innermost coil routed radially outwardly to one of said inlet and outlet manifolds such that a tubular connection between said one of said inlet and outlet manifolds extends radially across the other turns of said spiral coil.

4. The heat exchanger element as claimed in claim 3, further comprising at least one spider underlying said vertical stack of spiral coils, said at least one spider comprising a plurality of circumferentially spaced, radial arms, a plurality of vertical rods fixedly mounted at one end to respective arms of said at least one spider and extending upwardly therefrom, a transverse beam spanning across the uppermost coil of said stack, keyhole shaped notches within respective upper edges of said spacer bars at longitudinally spaced positions, respective turns of said spiral coils being snap fitted into said notches along the upper edges of said spacer bars for maintaining the coil turns in radially spaced positions on said spacer bars, and upper ends of said vertical rods extending through an uppermost spacer bar or said stack of spacer being adapted to be fixed to an inner surface of the reservoir housing said element to fix said stack of spiral coils to said housing along with said transverse beam and to render the coil-stack rigid.

5. The heat exchanger element as claimed in claim 4, wherein said spacer bars are elongated vertically, have a top and a lower end, the top of the spacer bars is provided with an arrowhead shaped barb and said lower end includes an arrowhead shaped slot sized to the arrowhead shaped barb, whereby the plurality of spacer bars are stacked vertically and interlocked to provide a stable support for the stacked coils.

6. The heat exchanger element as claimed in claim 5, wherein said at least one spider comprises a second spider positioned at the mid height of the coil stack, and wherein said vertical rods are four in number and connect alternate arms of the lower spider to corresponding alternate arms of the mid height spider and extend through holes within radially outer ends of the arms of the mid height spider to ensure rigidity of the coil stack supported by the spiders, the spacer bars the transverse beam and the vertical rods to resist a buoyant force of the two phase liquid.

7. The heat exchanger element as claimed in claim 4, wherein the notches within the upper edge of the spacer bars each include a notch entry portion of trapezoidal vertical cross-section defined by opposed converging sidewalls tapering downwardly and inwardly towards each other and terminating in a narrow width throat, a diverging vertical trapezoidal portion below said throat defined by converging oblique sidewalls and opening to a semi-cylindrical bottom portion of a radius corresponding to a radius of an outer periphery of the tubing snap fitted thereto.

8. The heat exchanger element as claimed in claim 5, wherein the notches within the upper edge of the spacer bars each include a notched entry portion of trapezoidal vertical cross-section defined by opposed converging sidewalls tapering downwardly and inwardly towards each other and terminating in a narrow width throat, a diverging vertical trapezoidal portion below said throat defined by converging oblique sidewalls and opening to a semi-cylindrical bottom portion of a radius corresponding to a radius of an outer periphery of the tubing snap fitted thereto.

9. The heat exchanger element as claimed in claim 6, wherein the notches within the upper edge of the spacer bars each include a notch entry portion of trapezoidal vertical cross-section defined by opposed converging sidewalls tapering downwardly and inwardly towards each other and terminating in a narrow width throat, a diverging vertical trapezoidal portion below said throat defined by converging oblique sidewalls and opening to a semi-cylindrical bottom portion of a radius corresponding to a radius of an outer periphery of the tubing snap fitted thereto.

10. The heat exchanger element as claimed in claim 1, wherein said reservoir is of hollow cylindrical form having an interior diameter in excess of the diameter of the first radially outer turn, wherein the diameter of said last radially inner turn is of a magnitude to provide a hole within each of said spiral coils, such that as the phase-change medium changes form as ice on the outer surface of each tube, there is a temperature averaging effect between adjacent tubes, thus ensuring an even build up of ice throughout the heat exchanger element, with the build up of ice displacing the phase-change medium in liquid form from around the spiral coils, in a vertical direction thereby creating two liquid regions, one within an annular space between an outer periphery of the heat exchanger element and the inner periphery of the reservoir and a second region interiorly of the last radially inner turn of the coils coinciding with the axis of the heat exchanger element.

* * * * *

UNITED STATES PATENT AND TRADEMARK OFFICE
CERTIFICATE OF CORRECTION

PATENT NO.   : 5,423,378
DATED        : June 13, 1995
INVENTOR(S)  : Warren H. Dillenbeck et al.

It is certified that error(s) appears in the above-identified patent and that said Letters Patent is hereby corrected as shown below:

Column 2, line 38, delete "(clockwise)", insert --(counterclockwise)--.

Column 3, line 10, delete "bean across the top of the";
        line 11, delete "coil stack and a transverse".

Signed and Sealed this

Twenty-third Day of January, 1996

Attest:

BRUCE LEHMAN

Attesting Officer      Commissioner of Patents and Trademarks